US007879917B2

(12) United States Patent
Cheng et al.

(10) Patent No.: US 7,879,917 B2
(45) Date of Patent: *Feb. 1, 2011

(54) DEFOAMERS FOR PULP AND PAPERMAKING APPLICATIONS

(75) Inventors: Huai N. Cheng, Avondale, PA (US); Eric Oswaldo Fernandez, Jacksonville, FL (US); John M. Sheepy, Ontario (CA)

(73) Assignee: Hercules Incorporated, Wilmington, DE (US)

(*) Notice: Subject to any disclaimer, the term of this patent is extended or adjusted under 35 U.S.C. 154(b) by 1166 days.

This patent is subject to a terminal disclaimer.

(21) Appl. No.: 11/297,024

(22) Filed: Dec. 8, 2005

(65) Prior Publication Data

US 2006/0128884 A1  Jun. 15, 2006

Related U.S. Application Data

(60) Provisional application No. 60/635,360, filed on Dec. 10, 2004.

(51) Int. Cl.
| B01D 19/04 | (2006.01) |
| D21H 17/13 | (2006.01) |
| D21H 21/12 | (2006.01) |
| B01F 3/08 | (2006.01) |
| C08L 83/04 | (2006.01) |
| B01F 3/12 | (2006.01) |

(52) U.S. Cl. ............... 516/117; 516/118; 516/120; 516/22; 524/588; 162/72; 162/75; 162/158; 162/164.4; 162/179

(58) Field of Classification Search ............... 516/117, 516/118, 119, 120, 22; 44/308; 162/72, 162/75, 158, 164.4, 179; 524/588
See application file for complete search history.

(56) References Cited

U.S. PATENT DOCUMENTS

| 3,076,768 | A |   | 2/1963  | Boylan |          |
|-----------|---|---|---------|--------|----------|
| 3,336,231 | A |   | 8/1967  | Marsh et al. | |
| 3,677,963 | A |   | 7/1972  | Lichtmann et al. | |
| 3,697,442 | A |   | 10/1972 | Liberman | |
| 4,024,072 | A | * | 5/1977  | Shane et al. | 516/123 |
| 4,028,218 | A |   | 6/1977  | Fink et al. | |
| 5,229,033 | A |   | 7/1993  | Nguyen et al. | 516/130 |
| 5,510,409 | A |   | 4/1996  | Romano | 524/322 |
| 5,645,762 | A |   | 7/1997  | Cook et al. | |
| 5,846,454 | A | * | 12/1998 | Koczo et al. | 516/11 |
| 5,990,181 | A | * | 11/1999 | Spyropoulos et al. | 516/118 |
| 6,177,481 | B1 |   | 1/2001 | Grape et al. | 516/124 |
| 6,265,456 | B1 | * | 7/2001 | Austin et al. | 521/112 |
| 6,656,975 | B1 | * | 12/2003 | Christiano et al. | 516/22 |
| 2003/0072776 | A1 |   | 4/2003 | Sun et al. | 424/401 |
| 2004/0180806 | A1 |   | 9/2004 | Esselbrugge et al. | 510/475 |
| 2006/0128816 | A1 |   | 6/2006 | Cheng et al. | 516/56 |

FOREIGN PATENT DOCUMENTS

| CN | 1060768 A |   | 5/1992 |
| DE | 23 45 335 |   | 4/1975 |
| DE | 32 42 202 |   | 6/1983 |
| DE | 41 20 961 |   | 1/1993 |
| DE | 42 43 272 |   | 6/1994 |
| DE | 197 41 912 |   | 9/1997 |
| DE | 19741912 C1 |   | 11/1998 |
| EP | 0 523 418 |   | 1/1993 |
| EP | 0 559 319 |   | 9/1993 |
| EP | 0 905 314 |   | 3/1999 |
| EP | 1075863 A | * | 2/2001 |
| EP | 1075864 A | * | 2/2001 |
| GB | 2 112 767 |   | 7/1983 |
| GB | 2 155 004 |   | 9/1985 |
| JP | 62241510 A |   | 10/1987 |
| JP | 62241511 A |   | 10/1987 |
| JP | 03044322 |   | 2/1991 |
| JP | 08-192001 | * | 7/1996 |
| JP | HEI8-192001 |   | 7/1996 |
| JP | 09-173003 | * | 7/1997 |
| JP | 9173003 |   | 7/1997 |
| JP | 2000 288308 |   | 10/2000 |
| WO | 00/61077 |   | 10/2000 |
| WO | WO 2004018073 A1 | * | 3/2004 |
| WO | 2005/001471 |   | 1/2005 |

OTHER PUBLICATIONS

English Language Machine Translation of JP 08-192001 online @ http://www19.ipdl.inpit.go.jp/PA1/cgi-bin/PA1NUMBER, JPO Tokyo, Japan, (downloaded Dec. 2008), pp. 1-15.*
English Language Machine Translation of JP 09-173003 online @ http://www19.ipdl.inpit.go.jp/PA1/cgi-bin/PA1NUMBER, JPO Tokyo, Japan, (downloaded Dec. 2008), pp. 1-6.*
O'Neil, Maryadele J. et al. (© 2006, 2010), The Merck Index-An Encyclopedia of Chemicals, Drugs, and Biologicals (14th Ed.-Vers 14.6), Merck Sharp & Dohme Corp., Whitehouse Station, NJ (Knovel Date: Dec. 1, 2007), Entries 08731, 02533, & 01898, Online @ http://knovel.com/web/portal/browse/display?_EXT_KNOVEL_DISPLAY_bookid=1863&VerticalID=0.*
Lewis, Richard J., Sr. (2002) Hawley's Condensed Chemical Dictionary (14th Edition), John Wiley & Sons, Online @ http://knovel.com/web/portal/browse/display?_EXT_KNOVEL_DISPLAY_bookid=704&VerticalID=0, headword = soybean oil, corn oil, and castor oil, (Knovel Release Date: Sep. 4, 2003; downloaded Dec. 3, 2010), pp. 1-2.*

(Continued)

Primary Examiner—Daniel S Metzmaier
(74) Attorney, Agent, or Firm—Joanne Mary Fobare Rossi

(57) ABSTRACT

A defoamer made from a composition that has at least one triglyceride oil or triglyceride oil mixture, at least one silicone, at least one silicone-triglyceride stabilizing agent, hydrophobic silica particles, optionally one or more surfactants and/or dispersants, and optionally one or more thickeners, and optionally one or more biocides. The defoamers described herein have utility in controlling foam in industrial applications. Typically, the defoamer can be used to control foam in pulp and paper applications.

16 Claims, No Drawings

OTHER PUBLICATIONS

McGee, James b., Water based Brownstock Antifoams, 24$^{th}$ EUCEPA Conference, Pulp Technology & Energy: May 8-11, 1990, pp. 322-330.

Pelton, R., A Review of Brownstock Defoamer Fundamentals, Pulp and Paper Canada, 90:2 (1989).

Allen, S.L., L.H. Allen and T.H. Flaherty, Defoaming in the Pulp and Paper Industry, Defoaming: Theory and Industrial Applications, ed. P.R. Garrett, Marcel Dell, New York, 1993, Chapter 3, pp. 151-175.

Chemical Abstracts 108: 74034j Novel defoamer for food manufacture Jpn. Kokai Tokkyo Koho (see JP 62,241,511 Abstract) pp. 565(1988).

Chemical Abstracts 108: 74035k Defoamers for food manufacture Jpn. Kokai Tokkyo Koho (see JP 62,241,510 Abstract), pp. 565 (1988).

Chemical Abstracts 127: 80567u Storage-stable defoaming oil compositions for foods, Jpn. Kokai Tokkyo Koho (see JP 9,173,003 Abstract), vol. 127, No. 6, pp. 623 (1997).

Chemical Abstracts, 130:53956a, "Method for Producing Defoamers Based on Oils,"(1999), Columbus, OH.

\* cited by examiner

DEFOAMERS FOR PULP AND PAPERMAKING APPLICATIONS

This application claims the benefit of U.S. Provisional Patent Application Ser. No. 60/635,360, filed on Dec. 10, 2004, the contents of which are hereby incorporated by reference.

BACKGROUND OF THE INVENTION

1. Field of the Invention

This invention relates to defoamers for pulp and paper mill applications based on natural renewable materials and synthetic oils.

2. Description of Related Art

Defoamers (or antifoams) are being used extensively in pulp and paper mill. Four factors contribute to foam generation: a liquid medium (such as water), chemically conducive agents (such as surface-active materials), a source of air, and mechanical energy. Pulp and papermaking systems have water in abundance, have many chemicals both intrinsic to wood and extrinsic due to processing chemicals, and entail much mechanical energy, such as water agitation, washing and thickening processes combining to result in the formation of foam. For example, in the washing of pulp in Kraft mills, foam is generated in black liquor, which is among the most difficult to defoam. Other pulp and paper applications of defoamers include their use in sulfite pulping process and in effluent and other water treatment.

Many defoamers have been employed for these applications. In the past, Kerosene has been used as a defoamer. Later defoamers include hydrocarbon oil or silicone oil, frequently containing hydrophobic particles in them Because of economic, environmental, and quality issues, it is desirable to decrease the use of hydrocarbon and silicone oil. The employment of triglyceride oils may be particularly attractive in this context because they are perceived to be less toxic and more "green."

There is still a need in the industry to find better foam control composition that works well in pulp and paper applications. It is desirable to have a foam control composition that remains stable before use and stays effective in the pulp or papermill environment.

SUMMARY OF THE INVENTION

This invention relates to defoamer compositions, comprising specific levels of at least one triglyceride oil, at least one silicone, and at least one stabilizing agent, for use in pulp and paper mill applications, preferably for applications including defoaming black liquor produced in the pulp treatment, defoaming sulfite pulping washing processes and for the treatment of effluent water from pulp and paper mills.

The defoamer composition described herein is an oil-based composition containing the following components:
  a) from about 6 to about 93% by weight of a least one triglyceride oil or triglyceride oil mixture;
  b) from about 12 to about 93% by weight of a silicone;
  c) from about 0.2 to about 12.0% by weight of a silicone-triglyceride stabilizing agent;
  d) from about 0.2 to about 12.0% by weight of a hydrophobic silica;
  e) from about 0 to about 12.0% by weight of one or more surfactants and dispersants; and
  f) from about 0 to about 10% of one or more thickeners.

In the oil-based composition, each of the triglyceride oil, triglyceride oil mixture, silicone, silicone triglyceride stabilizing agent as well as surfactants and dispersants have flash points above 140° F. (60° C.).

It is also possible to add an amount of water to the oil-based composition, wherein the composition further comprises from about 1 to about 55% water

DETAILED DESCRIPTION OF THE INVENTION

All amounts are given by weight unless noted otherwise. Percentages are given as weight percentage of total weight. Ratios are given as weight ratios.

The defoamers of the present application relate to an oil-based defoamer composition that comprises at least one triglyceride oil or triglyceride oil mixture, at least one silicone, at least one silicone-triglyceride stabilizing agent, hydrophobic silica particles, optionally one or more surfactants and/or dispersants, and optionally one or more thickeners, and optionally one or more biocides. It is a requirement that the silicone content of the oil-based defoamer composition be higher than about 12% by weight, preferably higher than about 22% by weight in order to impart high defoamer efficacies needed for the applications. Furthermore, each of the triglyceride oil, triglyceride oil mixture, silicone, silicone-triglyceride stabilizing agent as well as surfactants and dispersants have flash points of above about 140° F. (60° C.) or higher "Flash point" means the minimum temperature at which a liquid gives off vapor within a test vessel in sufficient concentration to form an ignitable mixture with air near the surface of the liquid, and shall be determined using the appropriate test methods. For liquids which have a viscosity of less than 45 SUS at 100 deg. F. (37.8 deg. C.), and which do not contain suspended solids, and do not have a tendency to form a surface film while under test, the appropriate test method is specified in the Standard Method of Test for Flashpoint by Tag Closed Tester (ASTM D-56-70) and should be used to determine the Flash point. For liquids which have a viscosity of 45 SUS or more at 100 deg. F. (37.8 deg. C.), or which contain suspended solids, or have a tendency to form a surface film while under test, the appropriate test method is specified in the Standard Method of Test for Flashpoint by Pensky-Martens Closed Tester (ASTM D-93-71) and should be used to determine the Flash point.

Water may be optionally added up to about 55% by weight to dilute the oil-based defoamer. This dilution often allows easier metering/control and application of the defoamer product. It also makes the product less costly.

The invention also relates to a method of controlling foam in industrial applications. Typically, the defoamer can be used to control foam in pulp and paper applications, such as Kraft and sulfite pulp washings, Fourdrinier paper formation process, paperboard formation, or mill effluent aeration. Foam in the process creates production problems and can lead to safety or environmental problems as well. Air (present as foam) increases the effective volume of process liquors, thereby reducing tank capacities by filling the tank with foam instead of liquid, and can cause vessel overflows, resulting in more housekeeping, environmental and safety concerns. Air entrained in pulp slurry impedes drainage of water from pulp fibers—thereby slowing down production rate in the pulp washing or papermaking processes.

The composition of the present invention is added to an aqueous process stream within industrial application at a point in the aqueous process stream just prior to or, alternatively, in close proximity where nuisance foaming occurs in an amount to effectively control foam produced in the aqueous process stream. In the case of aqueous process streams found within a pulp a paper applications, enough defoamer is added to the aqueous process stream to control this foam in an amount from about 0.1 to 4 pounds per ton of dry pulp produced. Although designed for pulp and paper applications, the same defoamers may also be used for other non-food industrial applications.

The present invention does not use hydrocarbon oils. It uses a combination of triglyceride oil, silicone and a stabilizing agent to reduce the amount of silicone or completely replace hydrocarbon oil often found in defoamers. The present compositions have added benefits in that they incur decreased cost and are more environmentally friendly than the previous alternatives.

The term "oil-based" is defined as oils that are from non-petroleum sources, e.g., triglyceride oil, silicone, or mixtures of triglyceride oil and silicone. In an oil-based defoamer, the oil(s) constitute the continuous phase.

The term "triglyceride oil" is defined as oils from plant and animal sources. Vegetable sources include but are not limited to soybean oil, corn oil, castor oil, and mixtures thereof Animal sources include but are not limited to animal fat. Also included in vegetable sources are modified vegetable oils, e.g., methyl ester of soybean oil, and ethyl ester of soybean oil. The triglyceride oil mixtures used herein are compatible and do not phase separate. Thus, two oils can be blended at any weight ratio. In one embodiment of the defoamer, a mixture of soybean oil and castor oil, in a weight ratio of about 96:4 is used. In another embodiment of the defoamer, a mixture of methyl ester soybean oil and soybean oil is used in a weight ratio of about 90:10.

Another ingredient of the defoamer of the present invention is a stabilizing agent, which decreases the tendency of the triglyceride oil and the silicone to separate into two phases during use. As a stabilizing agent for the triglyceride oil and the silicone, a modified silicone product may be used at low levels. Other examples of stabilizing agents include a phospholipid or more preferred a lecithin. For example, methyl ester soybean oil and silicone oil are usually not compatible (i.e., forming two separate phases). The addition of 1% lecithin by weight based on the weight of the oil blend has been found to increase the compatibility of methyl ester soybean oil and silicone oil by 40%.

For the purpose of this application, the following terminology is used for the silicone-containing substances:

"Silicone oil" refers only to silicone oil comprising primarily polydimethylsiloxane, such as Dow Corning® 200 Fluids, or General Electric's SF 96 fluids.

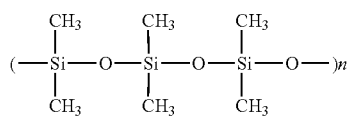

"Modified silicone product" refers to a grafted or crosslinked silicone polymeric system One example is the silicone polyether, with the following structure:

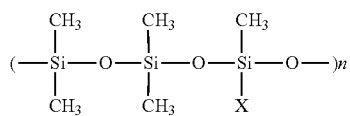

where X=polyether, such as poly(ethylene glycol), poly(propylene glycol) or copolymers. Many of these modified silicone products have surface active properties and are silicone surfactants.

"Formulated silicone product" refers to a formulated mixture that comprises one of more silicone oils (as above), modified silicone products (as above), and silica or hydrophobic silica, such as "Dow Corning® Antifoam A Silicone" compound, or other compounded silicone materials.

"Silicone material" refers to modified silicone product (as above) and/or formulated silicone product (as above).

"Silicone" refers to silicone oil and/or modified silicone product (as above) and/or formulated silicone product (as above) or blends of any of the aforementioned.

The silicone used comprises 0-99% by weight of silicone oil (preferably 0.5-80%), 0-30% by weight of modified silicone products (preferably 0.2-10%), and 0-60% by weight of formulated silicone products (preferably 0.2-45%). The total of the silicone oil, modified silicone products and the formulated silicone products must be approximately 99% of the silicone used. Some examples of modified silicone products are Dow Corning® Q2-5247, Dow Corning® 3581 Performance Modifier, Dow Corning® 3580 Performance Modifier, Dow Corning® 5329 Performance Modifier, Dow Corning® 2-5573 Performance Modifier (from Dow Corning), ICM 14P, ICM 884, and ICM 280B (from ICM), SF1188A, DA 40, and DA 33 (from GE Silicones). Some examples of formulated silicone products are Pulpsil® 160 C and Pulpsil® 330C (from Wacker), Antifoam A, Pulpaid® 2000, Pulpaid® 3000, Pulpaid® 3379, Pulpaid® 3500, Pulpaid® 3550, Pulpaid® 3056, Pulpaid® 3600, Pulpaid® 3754, and Pulpaid® 3990 (all from Dow Corning), and Defoamer S-409-4 (from DeBourg Corp.).

Another important consideration is the quantity of silicone used, which needs to exceed a specific level to satisfy the requirement for the applications herein. The defoamer composition also contains hydrophobic particles, optionally surfactants and/or dispersants, and optionally water, up to 55% based on the total weight of the composition. Other ingredients, such as thickeners and biocides, can be optionally added. Each of the triglyceride oil, triglyceride oil mixture, silicone, silicone-triglyceride stabilizing agent as well as surfactants and dispersants contained in the oil-based defoamer composition have flash points of 140° F. (60° C.) or higher.

The hydrophobic silica has a bimodal distribution of particle sizes, with average sizes of the particles of about 2 um and 110 um. Hydrophobic silica is available commercially, e.g., Aerosil® R972 from Degussa Corporation.

Hydrophobic silica particles are typically produced by baking a well-mixed blend of silica particles and one or more silicone oils (or, alternatively, by treating the silica particles with reactive silanes) at a prescribed high temperature. A variation is to use a silicone-containing surfactant, wholly or in part, in place of the silicone oil in the heat treatment mentioned above. Alternatively, a triglyceride oil may be applied on the surface of the silica particles to produce a hydrophobic silica. This hydrophobic silica can be used in the present invention.

Traditionally, hydrophobic silica materials used are based on silicone oil baked on silica. It has surprisingly been discovered that it is possible to bake triglyceride oils onto silica. Triglyceride oils normally do not react with silica Indeed, when triglyceride oil is heated with silica in nitrogen or under vacuum below 200° C., no substantial reaction is observed. It was found that when silica particles are minimally coated with either soybean oil or castor oil and heated in the presence of air at about 100° C. to 200° C., the oil does react with silica particles. Without wishing to be bound by theory, it is believed that partial oxidation of the oil facilitates binding of the oil to the particles, rendering the silica particles hydrophobic. The preferred reaction temperature is about from about 120° C. to 170° C., and more preferred about 150° C. The resulting triglyceride oil-reacted silica particles float on deionized water, indicating their hydrophobic nature. Thus, a few grains of silica can be put on top of a beaker of deionized water. If the silica sinks, it is not hydrophobic. If it floats, it is hydrophobic.

The oil-based defoamer composition of the present invention comprises from about 6 to about 93% triglyceride oil or triglyceride oil mixture (preferably from about 6 to about 64%, more preferably from about 6 to about 60%); from about 12 to about 93% silicone (preferably from about 22 to about 80%) based on the total weight of the composition; from about 0.2 to about 12.0% silicone-triglyceride stabilizing agent based on the total weight of composition (preferably from about 0.2 to about 6%); from about 0.2 to about 12.0% hydrophobic silica based on the total weight of composition (preferably from about 0.6 to about –8%); from about 0 to about 12.0% surfactants and/or dispersants based on the total weight of composition (preferably from about 0.2 to about –10%). The minimum silicone level is about 12% by weight, preferably about 22% or higher.

Optionally the oil-based defoamer composition can contain thickeners and/or biocides. The term "thickener", refers to a polymeric material, which at a low concentration increases the viscosity of an aqueous solution. The thickeners are used in an amount of from about 0 to about 10% (preferably from about 0-about 5%), and optionally biocides from about 0 to about 5% (preferably about 0-about 2%).

Examples of thickeners are hydrophobically modified hydroxyethylcellulose (HMHEC), Hydrophobically Modified Alkali-Soluble Emulsion Polymer (HASE), hydrophobically modified urethane-ethoxylate resin (HEUR), xanthan gum, guar gum, methylcellulose, and carboxymethylcellulose. Examples of biocides are sodium benzoate, benzisothiazolin, and 3,5-dimethyl-tetrahydro-1,3,5-2H-thiadizine-2-thione.

Surfactants are sometimes used in formulations. The preferred surfactants are the non-ionic types. Some examples are sorbitan fatty acid ester, glycerol fatty acid ester, fatty acid-poly(alkylene oxide) adduct, alkyl alcohol poly(alkylene oxide) adduct, alkylphenol poly(alkylene oxide) adduct, poly(alylene oxide), and silicone-based emulsifiers.

Water can optionally be one component of the composition. The water-containing composition of the present invention comprises from about 6 to about 92% triglyceride oil or triglyceride oil mixture (preferably from about 61 to about 92%, more preferably from about 65 to about 92%); from about 12 to about 92% silicone based on the total weight of the composition; from about 0.2 to about 12.0% silicone-triglyceride stabilizing agent based on the total weight of composition; from about 0.2 to about 12.0% surfactants and/or dispersants based on the total weight of composition. The minimum silicone level is about 12% by weight, preferably about 22% or higher. The water content in the composition can be as high as 55% by weight, preferable less than 40%, more preferable less than 26%, and even more preferably less than 22%. All functional components of the composition e.g., the triglyceride oil, triglyceride oil mixture, silicone, silicone-triglyceride stabilization agent as well as surfactants and dispersants have flash points of above about 140° F. (60° C.) or higher.

The following examples will serve to illustrate the invention, parts and percentages being by weight unless otherwise indicated.

EXAMPLES

Example 1

Defoamer Evaluation

Defoamers were evaluated for their defoaming efficacy on a foam cell, consisting of a graduated laboratory-type Nalgene® cylinder, the bottom of which was modified with a draw-off hole to allow drainage and recirculation. For liquid circulation we pumped the black liquor from the bottom draw-off through a mechanical pump (at a constant speed of 1800 rpm) and pumped the liquor back to the top of the cylinder. Column temperature was controlled using insulating and heating tape. Equal volumes of black liquor were added to the column for each test, and the temperature was kept constant throughout the test (e.g., 80° C.). Foam was generated by introducing air via an unsealed ¼ inch pipe nipple into the recirculation loop. The volume of the foam was measured every 15 seconds for 5 minutes. The defoamer was added to the black liquor just before foam generation. At least one control run was made every day where no defoamer is added. The foam cell conditions were adjusted such that the control run gave a foam volume at 5 minutes ($V_5$) of about 2000 ml. For consistency, all reported values of foam volumes were normalized to $V_5$=1000 ml for the control run for a given day. In the data reported, the normalized foam volumes at 45 seconds ($V_{0.75}$) and 5 minutes ($V_5$) are given.

These examples give two different compositions of oil-based defoamers (Obd-1 and Obd-2) with triglyceride oil, silicone, and lecithin as the stabilizing agent. The triglyceride oil used is a blend of 96:4 soybean oil and castor oil (vegetable oil blend). A comparative reference defoamer has been included, called Obd-A, which contained no triglyceride oil (Table 1).

TABLE 1

Oil-Based Defoamer Composition (all numbers in weight %)

| Ingredients | Obd-A (comparative) | Obd-1 | Obd-2 |
| --- | --- | --- | --- |
| Vegetable oil blend | 0 | 6.0 | 11.9 |
| Silicone oil, 1000 cs | 12.0 | 6.0 | 0 |
| Stabilizing agent | 0 | 0.8 | 0.8 |
| Hydrophobic silica | 1.0 | 1.0 | 1.0 |
| Dow Corning ® Antifoam A | 85.0 | 84.3 | 84.3 |
| Dow Corning ® Q2/5247 silicone (Dow Corning) | 1.9 | 1.9 | 1.9 |
| Span 80 sorbitan monooleate (Uniqema) | 0.1 | 0.1 | 0.1 |

The results of the defoamer efficacy test are summarized in Table 2. From the results of Obd-A, Obd-1, and Obd-2, the blends of silicone/vegetable oil/lecithin have comparable defoaming efficacy as that of all-silicone system (Obd-A).

TABLE 2

Foam cell results for the defoamers given in Table 1 (all numbers in ml foam)

| Defoamer | Use Level | $V_{0.75}$ | $V_5$ |
| --- | --- | --- | --- |
| Obd-A | 30 ppm | 70 | 415 |
| Obd-1 | 30 ppm | 70 | 500 |
| Obd-2 | 30 ppm | 100 | 485 |

Example 2

Effect of Silicone in Defoamer

As indicated, pulp mill black liquor is particularly difficult to defoam. By virtue of its low surface tension, silicone is an effective defoamer ingredient, despite its high cost. For illustration, a series of defoamer formulations were produced consisting of 92% triglyceride/silicone mixture, and methyl ester soybean oil (MESBO) used as the triglyceride oil. The composition is shown in Table 3. The ratio of MESBO and silicone was varied. These samples were quickly tested for their defoaming efficacy (given in Table 4). It is clear that in order to have $V_{0.75}$ less than 100 ml, a silicone level >12% is needed.

TABLE 3

Formulation of Oil-Based Defoamers

| Ingredient | Obd-3 | Obd-4 | Obd-5 | Obd-6 |
|---|---|---|---|---|
| MESBO | 92.0 | 89.7 | 82.7 | 78.0 |
| Silicone oil, 1000 cs | 0 | 2.3 | 9.2 | 14.0 |
| ICM 280B | 1.6 | 1.6 | 1.6 | 1.6 |
| Hydrophobic silica | 6.4 | 6.4 | 6.4 | 6.4 |

TABLE 4

Foam cell results as a function of silicone level (all numbers in ml foam)

| | Weight Ratio | | | |
|---|---|---|---|---|
| No. | MESBO | Silicone oil | $V_{0.75}$ | $V_5$ |
| Obd-3 | 100 | 0 | 195 | 795 |
| Obd-4 | 97.5 | 2.5 | 120 | 740 |
| Obd-5 | 90 | 10 | 115 | 740 |
| Obd-6 | 85 | 15 | 80 | 654 |

Example 3

Process for the Preparation of a Defoamer

A typical procedure for the preparation of an oil-miscible defoamer is given here. Hydrophobic silica, triglyceride oil, and silicone are mixed together at room temperature in a container and stirred for about 30 minutes to disperse. If needed, a mechanical impeller or an ultrasonic probe can be used. Lecithin is added and well mixed. The surfactants are then added, followed (optionally) by polymeric thickeners and biocide. With additional mixing, this produces an oil-miscible defoamer.

Sometimes the defoamer oil components can be very viscous. An alternative procedure is to mix hydrophobic silica into triglyceride oil at about 70° C. and stirred for about 30 minutes to disperse. If needed, a mechanical impeller or an ultrasonic probe can be used. The surfactants are then added followed (optionally) by polymeric thickeners and/or biocide, all at about 70° C. Lecithin is added, followed by slow addition of silicone with stirring. This produces an oil-based defoamer. Optionally, water is added very slowly up to 55% by weight to produce a water-diluted oil-based defoamer.

It is not intended that the examples presented here should be construed to limit the invention, but rather they are submitted to illustrate some of the specific embodiments of the invention. Various modifications and variations of the present invention can be made without departing from the scope of the appended claims.

The invention claimed is:

1. An oil-based composition which is used to control foam, comprising:
    a) from about 6 to about 93% by weight of at least one triglyceride oil or triglyceride oil mixture, wherein the at least one triglyceride oil or triglyceride oil mixture is selected from the group consisting of soybean oil, corn oil, castor oil, and mixtures thereof,
    b) from about 12 to about 93% by weight of a silicone,
    c) from about 0.2 to about 12.0% by weight of a silicone-triglyceride stabilizing agent comprising a phospholipid,
    d) from about 0.2 to about 12.0% by weight of a hydrophobic silica, and
    e) from about 0 to about 12.0% by weight of one or more non-ionic surfactants, wherein each of the at least one triglyceride oil or triglyceride oil mixture, silicone, silicone-triglyceride stabilizing agent as well as surfactants have flash points above 140° F. (60° C.).

2. The oil-based composition of claim 1, comprising:
    a) from about 6 to about 64% of said at least one triglyceride oil or triglyceride oil mixture,
    b) from about 22 to about 80% silicone,
    c) from about 0.2 to about 6% of said silicone-triglyceride stabilizing agent,
    d) from about 0.6 to about 8.0% hydrophobic silica, and
    e) from about 0.2 to about 10.0% of one or more non-ionic surfactants.

3. The oil-based composition of claim 1, comprising:
    a) from about 6 to about 92% of said at least one triglyceride oil or triglyceride oil mixture,
    b) from about 12 to about 92% silicone,
    c) from about 0.2 to about 12% of said silicone-triglyceride stabilizing agent,
    d) from about 0.2 to about 12% hydrophobic silica,
    e) from about 0.2 to about 12% one or more non-ionic surfactants, and
    f) from about 1 to about 55% water.

4. The oil-based composition of claim 1, comprising:
    a) from about 61 to about 92% of said at least one triglyceride oil or triglyceride oil mixture,
    b) from about 12 to about 93% silicone,
    c) from about 0.2 to about 12.0% of said silicone-triglyceride stabilizing agent,
    d) from about 0.2 to about 12.0% hydrophobic silica,
    e) from about 0.2 to about 12.0% of one or more non-ionic surfactants, and
    f) water in an amount of from about 1 to about 26%.

5. The oil-based composition of claim 1, wherein the phospholipid is lecithin.

6. The oil-based composition of claim 1, wherein the at least one triglyceride oil or triglyceride oil mixture is soybean oil.

7. The oil-based composition of claim 1, wherein the at least one triglyceride oil or triglyceride oil mixture is a blend of soybean oil and castor oil with a ratio from about 80:20 to about 98:2.

8. The oil-based composition of claim 7, wherein the at least one triglyceride oil or triglyceride oil mixture is a blend of soybean oil and castor oil in a ratio from about 90:10 to about 95:5.

9. The oil-based composition of claim 1, wherein the silicone is selected from the group consisting of silicone oil, modified silicone product, formulated silicone product, and mixtures thereof.

10. The oil-based composition of claim 1, wherein the silicone is a compounded silicone material.

11. A method of controlling foam in an industrial application comprising the steps of:
  obtaining an oil-based composition which is used to control foam, comprising:
   a) from about 6 to about 93% by weight of at least one triglyceride oil or triglyceride oil mixture, wherein the at least one triglyceride oil or triglyceride oil mixture is selected from the group consisting of soybean oil, corn oil, castor oil, and mixtures thereof,
   b) from about 12 to about 93% by weight of a silicone,
   c) from about 0.2 to about 12.0% by weight of a silicone-triglyceride oil stabilizing agent comprising a phospholipid,
   d) from about 0.2 to about 12.0% by weight of a hydrophobic silica, and
   e) from about 0 to about 12.0% by weight of one or more non-ionic surfactants,
  wherein each of the at least one triglyceride oil or triglyceride oil mixture, silicone, silicone-triglyceride stabilizing agent as well as surfactants have flash points above 140° F. (60° C.); and
  adding the oil-based composition to an aqueous process stream within the industrial application at a point in the aqueous process stream in an amount to control foam produced in the aqueous process stream.

12. The method in claim 11, wherein the industrial application is a pulp and paper application.

13. The method in claim 12 wherein the aqueous process stream comprises Kraft black liquor.

14. The method in claim 12 wherein the aqueous process stream is an effluent water in pulp and paper mills.

15. An oil-based composition which is used to control foam, comprising:
   a) from about 6 to about 93% by weight of triglyceride oil selected from the group consisting of soybean oil, corn oil, castor oil, and mixtures thereof,
   b) from about 12 to about 93% by weight of silicone oil comprising primarily polydimethylsiloxane and/or a modified silicone product comprising silicone polyether,
   c) from about 0.2 to about 12.0% by weight of silicone-triglyceride stabilizing agent comprising a phospholipid,
   d) from about 0.2 to about 12.0% by weight of hydrophobic silica, and
   e) from about 0 to about 12.0% by weight of non-ionic surfactant,
  wherein each of the triglyceride oil, silicone oil and/or modified silicone product, silicone-triglyceride stabilizing agent, and non-ionic surfactants have flash points above 140° F. (60° C.).

16. The oil-based composition of claim 15, wherein the hydrophobic silica has a bimodal particle size distribution.

* * * * *